May 21, 1968   T. W. ASTLE   3,384,294
PLASTIC BAG WITH TUCK-IN VALVE
Filed April 7, 1967
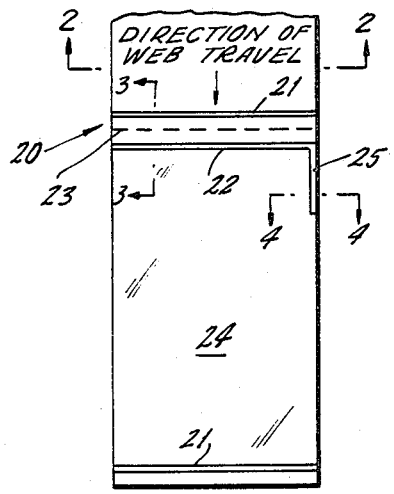
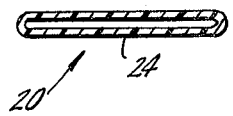
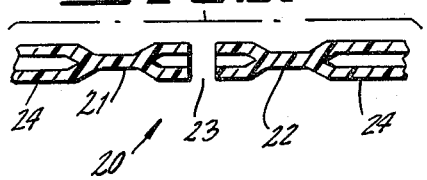
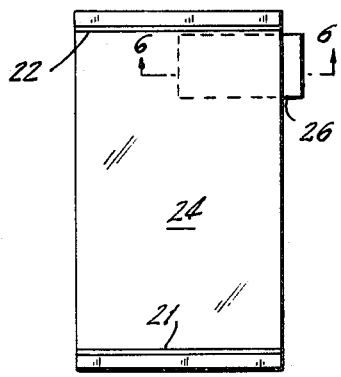
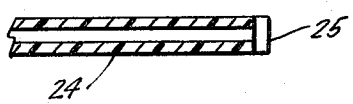
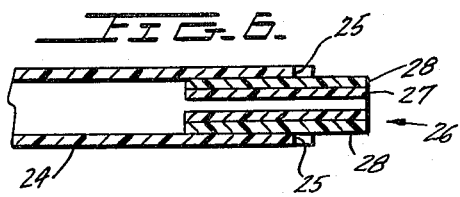
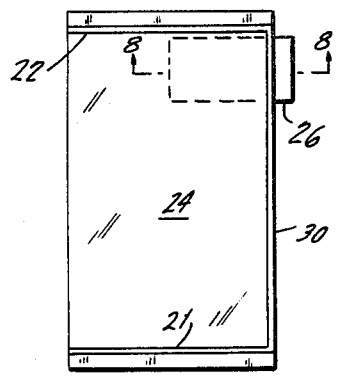
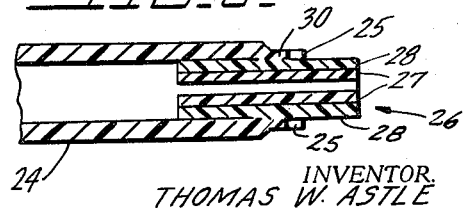
INVENTOR.
THOMAS W. ASTLE
BY Allen A. Meyer, Jr.
ATTORNEY 3,384,294
PLASTIC BAG WITH TUCK-IN VALVE
Thomas W. Astle, Orange, Conn., assignor to National Distillers and Chemical Corporation, New York, N.Y., a corporation of Virginia
Filed Apr. 7, 1967, Ser. No. 629,271
2 Claims. (Cl. 229—62.5)

ABSTRACT OF THE DISCLOSURE

A plastic tube is extruded and cut to bag lengths by a combination sealing and cutting bar in which two spaced heat seals are placed along spaced parallel lines perpendicular to the tube axis, and the lengths are cut from one another by a cut extending between the seals. At the same time, a slit is made along an upper portion of one of the bags. A flexible tube of laminated material is inserted partially into this slit, with its axis perpendicular to the axis of the main tube. The laminate has an interior body which does not readily heat seal to itself, while the outer layer is of material which easily heat seals to itself. The tuck-in valve tube is then secured to the bag by a heat seal extending along the edge of the bag containing the slit.

---

This invention relates to plastic bags having a tuck-in valve, and more particularly relates to a tuck-in valve for plastic bags which is formed of a thin gauge plastic sheath of two-ply structure having an interior layer of material which will not readily heat seal to itself and an exterior layer which readily heat seals to the material of the main bag body. The use of such a valve, which defines a fill spout opening, and which crumbles inwardly to prevent sifting of the bag contents from the bag when filled, permits novel manufacturing techniques whereby the valve can be heat sealed to the bag body without danger of sealing the valve closed.

Accordingly, a primary object of this invention is to provide a novel tuck-in valve structure for plastic bags.

A further object of this invention is to simplify manufacturing techniques for tuck-in valve bags.

Still another object of this invention is to decrease the manufacturing cost of plastic bags having tuck-in valves.

These and other objects of this invention will become apparent from the following description when taken in connection with the drawings in which:

FIGURE 1 is a plan view of a tube of plastic material during the shearing and sealing stage which forms the individual bags.

FIGURE 2 is a cross-sectional view of FIGURE 1 taken across line 2—2 in FIGURE 1.

FIGURE 3 is a cross-sectional view of FIGURE 1 taken across line 3—3 in FIGURE 1.

FIGURE 4 is a cross-sectional view of FIGURE 1 taken across line 4—4 in FIGURE 1.

FIGURE 5 is a plan view of the bag formed in the step of FIGURE 1 after the placement of a valve tube.

FIGURE 6 is a cross-sectional view of FIGURE 5 taken across line 6—6 in FIGURE 5.

FIGURE 7 is a plan view of the bag of FIGURE 5 after a heat seal is formed for securing the valve tube in place in the bag body.

FIGURE 8 is a cross-sectional view of FIGURE 7 taken across line 8—8 in FIGURE 7.

Referring first to FIGURES 1 to 4, there is shown a plastic tube 20 which is extruded in any desired manner, in the direction shown by the arrow. Bag 20 may be of any desired polyolefin material such as polyethylene and could have any suitable thickness such as 4 mils.

The tube 20 moves through a suitable sealing and slitting mechanism (not shown) which forms two parallel seals 21 and 22 which define the bottom and top, respectively, of their respective bags. A slit 23 then separates the lower bag 24 from the tube. At the same time, a slit 25 is cut through both panels of the bag along the edge thereof and extending inward from the edge for about 1/16 inch. The bag is now completely formed, sealed at its top and bottom, with the slit 25 formed in the upper portion of one edge thereof.

A small plastic tube 26 having a thickness of from 1 to 2 mils is then formed of a two-ply structure having an inner laminate 27 and an outer laminate 28, as shown in FIGURE 6. The inner layer is of a material of the type which does not tend to seal under heat and pressure, such as polypropylene, while the outer laminate 28 is of a readily heat sealable material such as low density polyethylene. Tube 26 is then inserted into slit 25, as shown in FIGURES 5 and 6, to a depth of about two inches, protruding from the bag for about one inch, for a three-inch tube.

Thereafter, tube 26 is secured to bag 24 by a heat seal 30 made along the entire right-hand edge of bag 24, securing the opposite panel edges to one another and to the opposing surfaces of outer laminate 28, as shown in FIGURES 7 and 8. Note that the tube 26 remains open since the interior opposing surfaces of laminate 27 will not seal to one another. Tube 26 now serves as a standard type of tuck-in valve which has been formed in a simple and economical fashion.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A plastic bag having a tuck-in valve; said plastic bag having an opening therein; said tuck-in valve comprising a flattened hollow tube of thin, pliable plastic material; said hollow tube partially inserted into said plastic valve through said opening; said hollow tube formed of at least an outer lamination and an inner lamination permanently and intimately joined to one another along their full adjacent surfaces; said inner lamination being of a relatively non-heat sealable plastic material; said outer lamination being of a readily heat sealable plastic material; the periphery of said opening being heat sealed around the outer surface of said hollow tube.

2. The bag of claim 1 wherein said opening is formed in an edge of said bag as a slit therein; the axis of said hollow tube generally perpendicular to the axis of said bag; said edge having a heat seal extending therethrough and across said slit.

References Cited

UNITED STATES PATENTS 3,004,698   10/1961   Ashton _____ 229—62.5
3,193,180   7/1965    Lissner _____ 229—62.5

DAVID M. BOCKENEK, *Primary Examiner.*